(12) United States Patent
Chapweske et al.

(10) Patent No.: US 9,210,200 B1
(45) Date of Patent: Dec. 8, 2015

(54) METHODS, SYSTEMS AND PROGRAM PRODUCTS FOR CONNECTING USERS TO OPERATING NODES

(75) Inventors: Adam Chapweske, Minneapolis, MN (US); Andrija Colovic, Chicago, IL (US); Jon Swanson, Queensbury, NY (US)

(73) Assignee: INSORS INTEGRATED COMMUNICATIONS, Chicago, IL (US)

( * ) Notice: Subject to any disclaimer, the term of this patent is extended or adjusted under 35 U.S.C. 154(b) by 768 days.

(21) Appl. No.: 12/705,894

(22) Filed: Feb. 15, 2010

(51) Int. Cl.
*G06F 15/16* (2006.01)
*G06F 15/173* (2006.01)
*H04L 29/06* (2006.01)
*H04L 29/12* (2006.01)

(52) U.S. Cl.
CPC .......... *H04L 65/403* (2013.01); *H04L 61/2517* (2013.01)

(58) Field of Classification Search
CPC .................... H04L 65/403; H04L 61/2517
USPC ................................ 709/203–204, 226, 229
See application file for complete search history.

(56) References Cited

U.S. PATENT DOCUMENTS

| | | | | |
|---|---|---|---|---|
| 6,816,904 B1 * | 11/2004 | Ludwig et al. | ................. | 709/226 |
| 7,007,098 B1 * | 2/2006 | Smyth et al. | ................... | 709/233 |
| 7,853,647 B2 * | 12/2010 | Maes | ............................. | 709/203 |
| 8,208,000 B1 * | 6/2012 | Swanson et al. | ........... | 348/14.08 |
| 8,260,854 B2 * | 9/2012 | Cockerton | .................... | 709/204 |
| 2001/0054071 A1 * | 12/2001 | Loeb | ............................. | 709/205 |
| 2003/0028363 A1 * | 2/2003 | Nobili et al. | ...................... | 704/1 |
| 2006/0190627 A1 * | 8/2006 | Wu et al. | ........................ | 709/249 |
| 2007/0250900 A1 * | 10/2007 | Marcuvitz | .................... | 725/141 |
| 2008/0095079 A1 * | 4/2008 | Barkley et al. | ................ | 370/260 |
| 2008/0129816 A1 * | 6/2008 | Mattila et al. | ............. | 348/14.08 |
| 2008/0273079 A1 * | 11/2008 | Campbell et al. | .......... | 348/14.08 |
| 2009/0251529 A1 * | 10/2009 | Tucker et al. | .............. | 348/14.09 |
| 2010/0198401 A1 * | 8/2010 | Waugh et al. | ................. | 700/237 |
| 2011/0161487 A1 * | 6/2011 | O'Sullivan et al. | ........... | 709/224 |

* cited by examiner

*Primary Examiner* — Minh-Chau Nguyen
(74) *Attorney, Agent, or Firm* — Greer, Burns & Crain, Ltd.

(57) ABSTRACT

A videoconference server for use with a videoconference system in which a plurality of users communicate video and audio data to each other, including at least one server external port, at least one resource distribution node operating on the server and having at least first and second internal ports, the first internal port in communication with the server external port, at least one operating node including at least one internal port which is in communication with the resource distribution node second internal port, and wherein the resource distribution node is configured to receive a request from a user over the server external port, the request for establishing a connection with the operating node, wherein the resource distribution node is configured to pass the connection with the server external port to the operating node to thereby establish a virtual connection between the user and the operating node using the server external port for communication of videoconference related data.

20 Claims, 5 Drawing Sheets

METHODS, SYSTEMS AND PROGRAM PRODUCTS FOR CONNECTING USERS TO OPERATING NODES

FIELD

A field of the invention is videoconferences. Additional fields include methods, systems and program products for connecting users to operating nodes within videoconference servers by utilizing resource distribution nodes that connect to both an external port of the server and to an internal port of the operating nodes, to create a virtual connection between the user and the operating node.

BACKGROUND

Collaboration events such as videoconferences can occur over a data network (such as, for example, the Internet, wide area networks or local area networks). During some such events, multiple users may be sharing video, audio and other data with multiple other users. Typically, users communicate in this way by each connecting to at least one of a plurality of conference servers. The conference servers are also interconnected, which therefore provides each user with a communication connection to each other user (i.e., by using the conference servers as a link). As such, videoconferences are typically conducted over a conference server or bridge. Indeed, all attendees connect to the server, and the server routes audio and video data between the users.

Typically, users connect to a bridge by establishing a connection through a port on the bridge. Since the bridge is maintained on the server and the user connects from outside the server, the port on the bridge is configured as an external port (meaning it can receive requests originating from outside the server). However, since these ports receive external data, they are highly susceptible to malicious data. Firewalls and other regulatory hardware or software solutions are often used to minimize these risks. However, it is often difficult to configure firewalls in such systems, particularly given that there are multiple external ports to configure and that the number of external ports changes as new bridges are added to or removed from the conference servers. These and other problems may be particularly acute in large scale conference systems where there is a plurality of servers and each has a plurality of bridges utilizing an external port.

SUMMARY

One embodiment of the invention is a videoconference server for use with a videoconference system in which a plurality of users communicate video and audio data to each other, comprising at least one server external port; at least one resource distribution node operating on the server and having at least a first internal ports in communication with said server external port; at least one operating node in communication with the resource distribution node, and wherein said resource distribution node is configured to receive a request received from a user over the server external port, the request for establish a connection with the operating node, the resource distribution node configured to pass the connection with the server external port to the operating node to thereby establish a virtual connection between the user and the operating node using the server external port for communication of videoconference related data, both the request and the videoconference related data communicated using the server external port.

As such, the resource distribution node serves as an intermediary between the users and the conference severs using internal ports, thereby limiting the number of external ports required in the videoconferencing system. Other examples of the invention and further details of embodiments are described below.

DETAILED DESCRIPTION OF EMBODIMENTS

Before discussing particular features of example embodiments in detail, it will be appreciated that the present invention may be embodied in a method, system, and/or computer program product, including but not limited to videoconference methods, videoconference systems and videoconference program products. For example, a method according to one embodiment may be carried out by one or more users using computers or by one or more computers executing steps of the invention, and a program product of the invention may include computer executable instructions stored on a tangible memory medium (that may be, for example, non-volatile memory, a magnetic or optical disk or other magnetic or optical media, electrical, chemical, electrochemical, or other tangible media) that when executed by one or more computers cause one or more computers to carry out steps of a method of the invention. The program instructions and methods of embodiments of the invention transform data, cause results of computations and/or data to be stored in one or more memories and/or to be displayed on displays, with such storage and/or display causing a transformation of physical elements such as a physical alteration to a memory media that may be read to recover the stored data. Further, one or more computer(s) or other processor based devices in combination with connected hardware such as one or more of cameras, microphones, monitors, projectors, and the like that are carrying out steps of a method of the invention and/or that are miming a program product of the invention embody a system of the invention.

Further, one or more computers, alone or in combination with connected hardware such as one or more cameras, microphones, monitors, projectors, and the like, that are carrying out a step of a method of the invention and/or that are running a program product of the invention may embody a system of the invention. It will therefore be understood that when describing a method of the invention, a system and/or a program product of the system may likewise be described, and vice-versa. It will also be appreciated that various computer program product embodiments of the invention may cause physical changes to occur, and to result in a physical transformation of data and signals to cause a tangible physical result. As examples, tangible memory devices may be physically altered to store or retrieve data; electronic or other data may be converted to cause speakers to produce sounds and to cause monitors or projectors to output light or otherwise alter the physical state of a display device so that images are displayed. In considering the below description, many additional tangible results and physical changes that occur through operation of program products of the invention will be appreciated.

It will therefore be understood that in describing a particular embodiment of the present invention, be it a method, system or program product, descriptions of other embodiments may also be made. For example, it will be understood that when describing a method of the invention, a system and/or a program product of the system may likewise be described, and vice-versa.

Users may be connected to any of the redundant servers, applications, or other resources. As an example, a single server may have multiple redundant instances of applications/operating nodes running thereon, each of which is capable of executing a particular request. Determining a most efficient arrangement of usage can be both a very important and a very difficult task. Embodiments of the present invention provide a novel and valuable solution, through provision of resource distribution nodes across the network that are configured to manage distribution of resources. Further, embodiments of the invention provide for enhanced efficiency of connection from a resource distribution node internal to a server to an operating node, with an example being a conference bridge node that is also internal to that server. While in the prior art a user may have had to establish two different external port connections to a server for some transactions (e.g., a first to connect to the resource distribution node to determine which operating node to connect to, and then a second to connect to that operating node), embodiments of the invention allow for only a single connection. A first connection is established to a first external port to communicate with the resource distribution node, and the resource distribution node then "passes" this connection seamlessly to the selected operating node so that no second connection to a second external port is required. Significant advantages and benefits are therefore achieved.

These and other aspects of invention embodiments will be described below. Before coming to details of resource distribution nodes, however, some detail will be helpful regarding basic aspects of videoconference systems, methods and program products of the invention.

Figure 1:
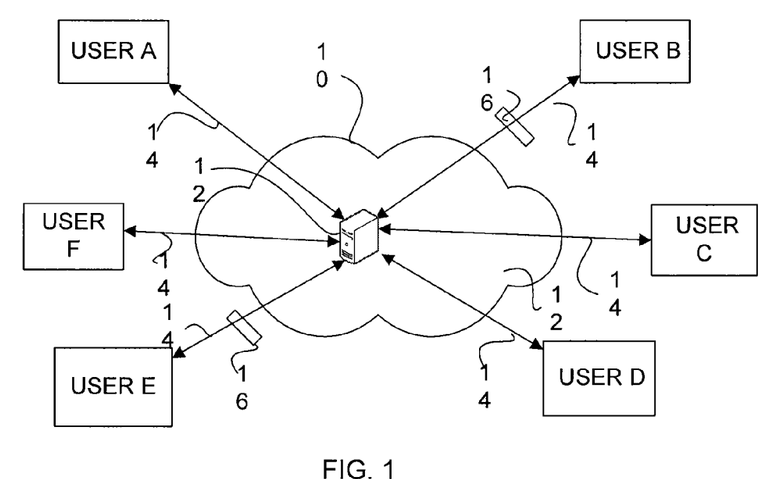
FIG. 1 is a schematic of a network useful to practice embodiments of the invention.

Turning now to the drawings, FIG. 1 is a schematic of a network 10 that is useful to describe example methods, program products and systems of the invention. The network shown as cloud 10 includes one or more computers 12 that link Users A-F to one another for conducting videoconferences. The term computer as used herein is intended to be broadly interpreted as at least one electronic device that accepts, processes, stores (at least temporarily), and outputs data according to programmed instructions. Thus, a computer can include, by way of example and not by way of limitation, a laptop computer, mainframe computer, cell phone, personal digital assistant, and processor-based controller on a machine. The computer 12 may also comprise one or more components for linking communications between users. It may include, for example, one or more processor based devices linked to one another for communications and each having a plurality of communication ports, a software component running on one or more memories that facilitate communications, a networking card(s), a modem(s), and the like.

The computer 12 can be referred to in the video/audio conferencing and networking arts as a conference server, bridge (or as containing a bridge), or the like which can be, for example, a software component running on a server or router that controls one or more ports for interconnecting the Users A-F. As used herein the term port is intended to be broadly interpreted as a physical or logical destination and/or origination point for digital communications (e.g., for the exchange of data between two or more programs). Ports are often identified by a port number of another identifying value (e.g., a character string). Tables or other similar constructs are typically maintained by the operating system to keep track of port values and allocations or connections thereto. Examples of ports include but are not limited to, network cards, an IP address, a TCP or UDP port number, and the like. A bridge may also comprise software useful to, for example, specific one or more ports for communication between those users. In many embodiments all users A-F are connected to one another using a single bridge or conference server 12.

Ports are also characterized as being either internal or external. Internal ports are configured such that they are only accessible from a limited set of one or more components or processes. Internal ports can be useful for communications between processes or components operating on the same computer. For example, consider a bridge having an internal port and which is maintained on a server. In one example configuration, the internal port is only accessible from other components and processes included on the server. Therefore, an outside user could not directly communicate with the bridge using that internal port. On the other hand, if the bridge included an external port, it would be accessible from outside users. However, as noted above, there is an additional concern associated with external ports in that they are more susceptible to receiving malicious data. As such, typically firewalls or other regulating mechanisms are employed to monitor the external ports minimize such risk. Notably, embodiments comparing the use of internal ports to external ports will be discussed in further detail below. One example of internal ports is domain sockets, including Unix domain sockets, inter-process communication domain sockets, and the like.

In embodiments of the invention, a table or other construct may be kept that cross references internal or external ports with connections thereto, and such tables may be queried by the resource distribution node, the operating system, and/or an operating node as may be necessary to establish or pass connections or for other purposes. Further, while internal ports can be statically created, in many invention embodiments they are typically dynamically created such that ports are allocated and deallocated so as to continuously be tailored to the communication needs of the system. In some invention embodiments tables are modified upon internal port creation, destruction, allocation, deallocation, connection, disconnection, and upon other changes in status.

In some applications, a group of individual servers 12 may be linked to one another for collectively carrying out the functionality of a server 12. In such instances the group of individual servers is viewed, for practical purposes, by the outside world or network components as being a single server 12. Upstream and downstream components essentially treat the group as being a single server, and the group of servers performs as if they were a single server. For purposes of description of the present invention, it will therefore be appreciated that the server 12 may be a group of linked servers that act as a single server.

The conference server 12 may be located on company premises, with an example being at an office where the end users A-F reside. In other applications some or all of the users A-F may be external from the location where the conference server 12 is. Some or all of users A-F may be, for example, branch offices, home-based workers or traveling employees that connect to the server 12. In still other applications, the conference server 12 may be located at a commercial communications service provider such as a telephone, broadband, or internet service provider data center, with users A-F located at one or more offices and establishing connections 14 to the conference server 14 using the internet.

The network 10 may be all or part of a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may be the Internet, a private network, a public network, a virtual private network, Local Area Network (LAN), all or part of a Wide Area Network (WAN), all or part of a Metropolitan Area Network (MAN).

The network 10 may also be a successor to the current Internet (such as, for example, the Fast Internet, or Grid, currently under development by the European Centre for Nuclear Research (CERN) based in Geneva, Switzerland). The CERN Fast Internet is expected by some to transmit data orders of magnitude faster than what is currently understood to be broadband speed. The Fast Internet and each other successors to the Internet are referred to herein simply as fast versions of the Internet.

The protocol between the computer 12 and the Users A-F may be that of a server and client. The server client relationship between the computer 12 and the Users A-F may be reversed on occasion, wherein for some tasks the computer 12 is the client and the User A-F the server, and vice-versa for other tasks.

The network 10 may be useful for a number of data communication purposes. In an example application, the network 10 is useful to facilitate a real-time communications session, such as a videoconference, between one or more of the Users A-F. Examples of a videoconference include two or more of the Users A-F communicate streaming video and/or audio communications in real-time with one another, whereby all participating users can see and hear all other users in substantially real time.

As used herein the term "real-time" is intended to broadly refer to a condition of generally corresponding to actual time. For example, data can be real-time if it takes about one minute of data playback to describe an event that took about one minute to occur. Real-time data may be, but is not necessarily, "live" data that is generated and communicated substantially contemporaneously with minimal delay or such that the delay is not obtrusive with respect to a particular application. As an example, delay of less than several seconds, or less than 1.0 or 0.25 second, or another, similar time between an event and a communications of such event to another computer user may be considered live for the purposes of the present system.

In a videoconference, for example, multiple participants may be sending and receiving live real-time video and audio data to one another—each is talking to one or more of the others in real-time with delay at a suitably minimal level so that "conversations" between users over the network can take place in real-time. It will therefore be appreciated that the terms, "live" or "real-time" when used in this context is not limited to zero delay, but instead that some minimal delay is allowed for which may be for example of the order of several seconds. The delay should not be so great as to cause difficulties in different users communicating with one another—delays greater than about 5 seconds may be unsuitable in many applications.

In many videoconference or other real-time collaboration events, all of users A-F may see and hear all others of users A-F in real-time by simultaneously communicating audio and video data streams to all others of the users A-F. Communications between each of the users A-F may be carried out on a two-way basis from the network 10, with data sent to and received from each of the Users A-F over the communications lines 14. These may comprise physically wired connections such as copper wires, optical fiber cables, or the like; or may be wireless connections. Real-time video, audio, and other data may be communicated from each of the users A-F to all others of the users A-F through the server 12 and over the communications lines 14.

A firewall 16 or other security device may isolate the users A-F from the network 10. The firewall 16 has been illustrated in FIG. 1 as located on the communications link 14. This has been done for illustration only—one or more firewalls 16 may be at any desired location useful to monitor and control access of traffic between a user A-F and the network 10.

Those knowledgeable in the art will appreciate that communications over the network 10 between the users A-F may be carried out in any of a number of generally known procedures. For example, known methods of one or more of uni-, multi-, or broadcast may be used. Also, the data may be streaming. In a streaming video communications session application, each user A-F may have one or more cameras, telephones and/or microphones from each of which is streamed a continuous, real-time data on a particular unicast or multicast address and port number. As used herein the term continuous data stream is intended to broadly refer to a data stream sent in substantially continuous succession, although some degree of intermittency is contemplated.

For example, a packetized data stream in IP may be continuous and streaming even though there may actually be some minimal delay between discrete packets. Different protocol communications may be supported by the network 10 and the users A-F, including but not limited to ITU H.320, ITU H.323, ITU H.324, SIP (session initiation protocol), RTP (real time protocol), RTSP (real time streaming protocol), RTTP (real time transport protocol), HTTP (hyper text transfer protocol) and other suitable protocol for initiating and communicating real time and streaming data. It will be appreciated that when used in this context, the term "communicated" is intended to be broadly interpreted and does not require direct communication. For example, a first user A may communicate data to a second user B, even though the data passes through a number of intermediate nodes between origination and final destination.

Figure 2:
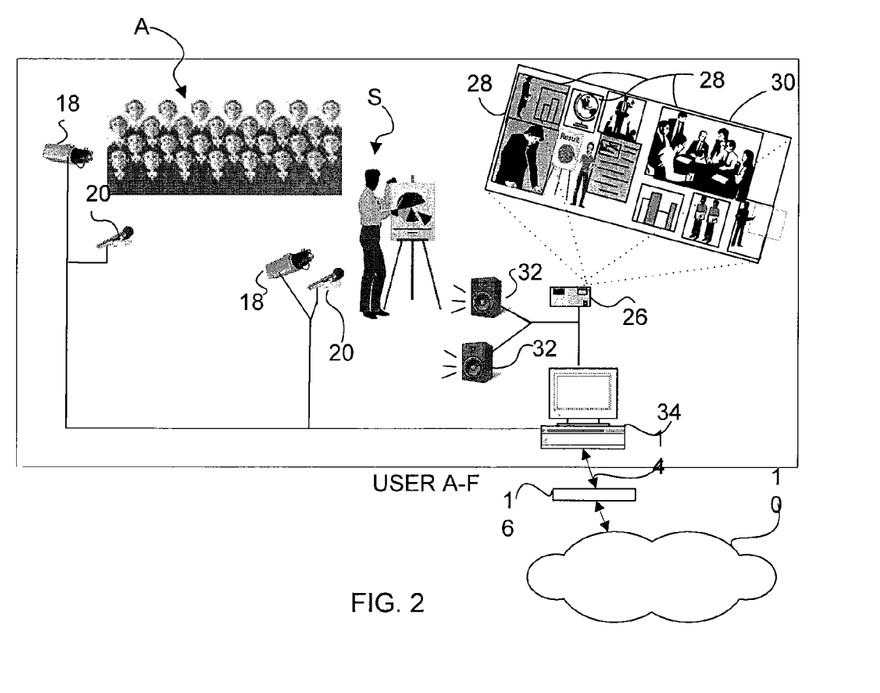
FIG. 2 is a schematic of one example video conference attendee room useful to illustrate embodiments of the invention.
Figure 3:
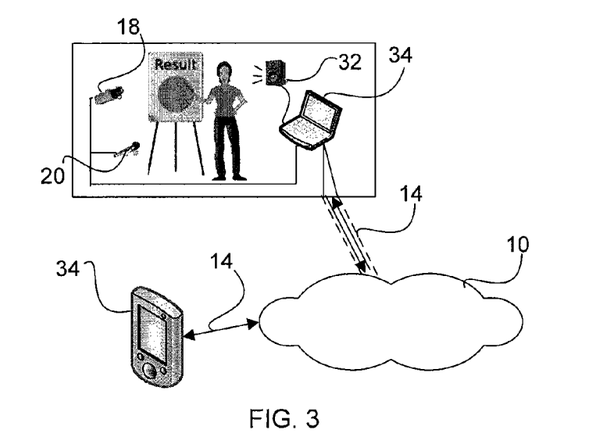
FIG. 3 is a schematic of a second video conference attendee room as well as a handheld computer useful to illustrate embodiments of the invention.

Communications of the streaming data between users A-F may be further appreciated through consideration of FIGS. 2-3 that schematically show some representative configurations of the users A-F. As shown by FIGS. 2-3, the users A-F may be conference rooms, class rooms, or other spaces in which one or multiple individuals gather to participate in the video communications session with other individuals that are located at others of the users A-F. Each user A-F may have one or more cameras, microphones, speakers, video screens, and other devices for communicating audio and video data.

With reference to FIG. 2, cameras 18 at one user A-F may be trained on different people or things at that location, with an example being one camera 18 at an audience A and one camera 18 at a speaker S. The cameras may be controllable remotely, so that user A may be able to direct the direction of a camera 18 at user B, for instance. At other locations, with examples shown in FIG. 3, only one camera 18 is present. Many different cameras will be appropriate for practice of example embodiments, with suitable examples including those available from LOGITECH Co., Fremont Calif. (e.g., Logitech QuickCam Pro 4000), the MICROSOFT LifeCam VX-1000, the SONY EVI D100 series and/or the CANON VC series of remote pan/tilt cameras, and the like. Also, many communication devices are commercially available with built in cameras, including laptop computers, smartphones, and the like.

In FIG. 2, two microphones 20 are provided—one for receiving audio from the instructor S and a second for receiving audio from the audience A. There are a wide variety of suitable microphones available for practice of embodiments of the system, including by way of example SONY ECM microphones, PHOENIX Duet microphones, POLYCOM microphones, and the like. Although not illustrated, those knowledgeable in the art will appreciate that other cameras, microphones, computers, gateways, firewalls, mixers, multiplexers, and like devices may also be present depending on desired video communications session details and other factors. Several microphones 20 may be desirable, for instance, to surround the audience A or speaker S to ensure accurate pick-up of audio. A mixer board may be provided for mixing of audio and/or video signals. These elements may be parts of system embodiments of the invention. Also, many portable computers 34, with examples including laptop computers and portable computer devices such as personal digital assistants, cellular phones, smart phones and other devices have a microphone and/or a camera built in.

FIG. 3 illustrates an alternate configuration in which a single individual is participating in the conference at one of the locations of user A-F. In FIG. 3, only a single camera 18 is provided and a single microphone 20 along with a laptop computer 34. This could represent, for instance, a business person participating from a hotel room, train or plane while traveling. Other participants may be located, for example, in a vehicle (such as an auto, truck, train, plane, boat, etc.), a home office, or other location. The camera 18 (such as a LOGITECH QuickCam), microphone 20 and speaker 32 might be combined with a laptop, or the microphone 20 and speaker 32 might be contained in headphones worn by the user. Suitable headphones include those available from PLANTRONICS Corp. This example configuration is particularly convenient for portable participation in video communications sessions.

FIG. 3 also illustrates a second computer 34 in the form of a portable handheld device (shown in enlarged scale relative to laptop 34 for clarity) that may be used to participate in a videoconference. Computer 34 may be a handheld computer, a cellular or other portable phone equipped with a small monitor, a smartphone, a handheld entertainment device, or the like that is capable of communicating with the network 10. Examples of computer 34 include the IPHONE from Apple Computer Corp. (Cuppertino, Calif.), a BLACKBERRY brand phone from Research in Motion, Corp., a SONY VAIO handheld micro PC (such as model number VGN-UX180) from Sony Corp., an IPAQ Smartphone from Hewlett-Packard Corp. (California) (such as model HP iPAQ 910c), or the like. Many of these and similar devices have a display, a camera and a microphone built-in, or may have these added as peripheral devices connected thereto.

In an example video communications session such as a videoconference, each of the users A-F not only sends streaming video and audio data, but likewise receives streaming video, audio, and other data communicated from some or all of the other users A-F. In many applications it is desirable to have all users send and receive streaming audio and video data to all others of the users whereby each user can see and hear all other users simultaneously. In many invention embodiments, video data streams are communicated in an individual, discrete manner. That is, each user sends and receives individual, discrete, un-bundled video data streams from all other users. Audio streams, on the other hand, may be communicated in a discrete, individual basis to a conference bridge or other location where they are bundled for convenience of communication to end user recipients. Referring once again to the schematics of FIG. 2 by way of example, one or more projectors 26 may be provided to project real-time video images 28 from one or more of the other users A-F on a screen 30.

There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being one having at least 2000 lumens and XGA resolution. Also, it will be appreciated that use of a projector to display output images may easily be replaced with use of a monitor on which output video images are viewed. For example, FIG. 3 illustrates a laptop computer 34 and a handheld smartphone which each have an integral monitor which can be used to display output video data streams 28 from others of the users A-F.

Other larger size monitors may also be useful for display of video data, with examples including standard cathode ray tube monitors, 19", 40", 50" and larger plasma, LCD and other technology monitors. One or more speakers 32 may also be provided to play real-time audio from the other users or other sources. Also, as described above, many devices (with particular examples including laptop computers and portable phone devices) have built in displays.

Any number of video images may be provided that show video data in real-time from any number of other cameras or other sources located at the other users. For example, the user A may simultaneously display output video data streams 28 from each of the other users B-F, or may choose to display on a select subset of those streams. The display of streams may be set as desired, with different output display streams 28 located in different locations on the display 30. Further, the output video streams 28 may include charts, graphs, documents, other digital files, replayed video files, and the like. In many embodiments of the invention, users may select which video, audio and application data to view so that a highly customizable conference experience is provided for each user.

Digital documents such as charts, word processor documents, spreadsheets and the like may be input to any of the computers 34 at any of the users A-F for display at all or some of the other users' locations. Likewise, digital images, including stored video streams and digital documents, for instance, may be stored in a memory accessible over the network 10 for replaying during the video communications session at any or all of the users A-F. Output video streams 28 may be manipulated as desired, with examples of manipulation including moving the images, resizing the images, and the like.

A particular example of a data file in addition to audio and video data includes shared files (sometime referred to as documents) having text, images, numerical values, and the like. For example, within a videoconference or virtual meeting different of the users A-F at different locations may desire to all work on a single document. In such circumstances, the single document may be described by a shared file stored on the network and which can be modified by any of the users A-F. Each user A-F receives continuous updates of the document so they are aware in close to or at real-time of modifications and the current state of the document.

A variety of other shared files may be useful in conducting collaboration events within practice of the system. It may be useful, for example, for each of the users A-F to know in (or close to) real-time which other users are connected to the network 10 and available for conferencing. This can be accomplished through the server running a user presence application and maintaining a shared user presence file on the network 10 that is regularly updated to reflect currently available users A-F.

Presence data may indicate which of users A-F are currently logged in, registered or otherwise connected to the conference server 12 and are available for conferencing. Presence data may further include information such as current status ("available," "busy—in another conference," "do not disturb," "currently conferencing in meeting no. 1234 with users 1, 13, and 17 . . . ", etc.). Users A-F also receive regular updates of the user presence data to ensure it is current. There may also be shared files maintained on the network 10 that list the current status of hardware at each of the users A-F (e.g., which of cameras 18 and microphones 20 are on, what their settings are, etc.), chat applications, and others. Specific techniques for ensuring accuracy of presence data will be described in greater detail below.

Embodiments of the invention may include other users (not shown) that participate in a videoconference but that do not communicate both audio and video (or other types of) data. An example includes a conference attendee (not shown) that participates over a phone together with users A-F via audio data only. Accordingly a videoconference carried out according to systems and methods of the invention may include a plurality of users (such as A-F) that each communicate audio and video data to each other, as well as additional user(s) (not shown) that participate by audio only (or video only, or some other limited set of data communication), with an example being a phone participant utilizing audio data only. In other example embodiments, users may participate in a video only mode. A participant with a smart phone, for example, may receive a video stream for viewing and/or participate by phone for an audio stream.

The one or more computers 34 at each of the users A-F may be used to receive and send all of the video, audio, documents, digital files and other data at the standard user A. The computer 34 may be referred to as a client computer or client, although as noted above it may also function at times as a server with the computer 12 being a client. A variety of computers that are currently commercially available will be suitable for use as computer 34, with examples including the Dell Precision 470 with dual processors and the HP Workstation XW6000 dual processor.

As with the computer 12, the computer 34 is intended to be broadly interpreted and is not limited to a single, desktop type computer as illustrated. Other devices that include a processor capable of executing instructions may be used, although they may sometimes be referred to as a device other than a "computer." Examples include other devices described above with reference to the laptop and handheld computers 34 illustrated in FIG. 3, as well as smart phones and other communication devices described above. Accordingly, the term "computer" as used herein with reference to computer 34 (and computer/server 12) is intended to be broadly interpreted. Further, the computer 34 may be comprised of two or more computers linked to one another.

An application program, including one or more codecs, may be running on the computer 34 to transform input or output video or audio data, to provide signal coding/decoding, compression/decompression, to coordinate receiving and sending of the data streams, and to control other aspects of sending and receiving of the data streams. For example, the computer 34 may be used to control which or how many video images 28 are displayed on the screen 30, to size the images 28, to set audio levels for the speakers 32, and the like. Each computer 34 may be running a video codec, an audio codec, other codecs, one or more application programs, and other programs. These may be combined into a single application program or may be separate from one another. The computer 34 may also have video and audio capture cards, with an example being WEBCAM Corp. 4 input video capture card.

According to the configurations of FIGS. 1-3, a videoconference or other virtual meeting can occur between two or more of the users A-F. The users A-F may virtually "attend" an immersive and extensive virtual meeting that includes audio, video and/or other streaming data shared in real-time. Participants at each of the users A-F may simultaneously hear and/or view data from all others of the users A-F. Or, in some embodiments, one or more users may receive an abbreviated set of streaming data. As an example, the laptop 34 and handheld computer 34 illustrated in FIG. 3 may receive only one, two or three selected video streams. This may be desirable, for instance, to suit the relatively small screen of the handheld computer 34.

One or more users A-F may collaboratively work on one or more shared documents held on the network 10 with each receiving regular updates of modifications made by others. Such meetings may be desirable for corporations, universities, government, and other groups of people located remotely from one another that find it useful to interact in an environment that allows a greater level of intimacy and/or information sharing than an audio-only phone call or a single image video conference.

During the carrying out of a collaboration session such as a videoconference of the invention, data may be converted, transformed, stored in tangible memory media, and displayed using monitors. As an example, sound waves are received by microphones 20 and light by cameras 18 and converted to representative analog and/or digital data. This data may be communicated by computers 34 and 12, stored in tangible memory media such as magnetic, optical, chemical or electrical media on the network 10 and/or locally. Such storage may result in physical changes to the memory media. The data may also be transformed or otherwise physically changed for output. As an example, video stream data is ultimately displayed using a monitor or projector, and audio stream data is converted to power signals for causing speakers to output corresponding sound waves. These and other physical transformations of data into tangible objects or media occur through practice of embodiments of the invention.

Applications for use of video communications sessions of the present system include, but are not limited to, distance learning, medical consultation, business meetings, industry collaboration, social interaction, government or university collaborative research, entertainment, gaming, financial market trading, and the like. In a distance learning application, a professor at one site (e.g., user A) may be able to take questions from students located at many additional sites (e.g., users B-F), which can be locally located (e.g., different rooms or buildings in same campus) or very far from one another (e.g., different cities, states or countries).

In some communications sessions of the system, each of the sites can view and hear all of the other sites. In a medical consultation application, doctor specialists from around the country can participate in the diagnosis of a particular case. X-rays can be viewed by all, and each doctor at each location can discuss the case with all of the other participating doctors. In an industrial collaboration application, remotely located engineering, marketing, management, and labor teams may all discuss development of a new product. Each site may ask questions of any other site, and each site may submit documents and charts covering aspects of the project for which they are responsible.

Referring once again to FIG. 1, when a collaborative communications session such as a videoconference occurs between the users A-F, multiple video, audio and other data streams may be communicated between the various users and over the conference server 12. A rich, immersive, and extensive virtual meeting environment may be provided that includes video, audio, and other streaming data shared in real-time between multiple participants at multiple locations. Participants at each of the users A-F may simultaneously communicate audio and video data to all others of the users A-F whereby each user can simultaneously see and hear all other users. Such meetings may be desirable for corporations, universities, government, and other organizations that have groups of people located remotely from one another that need to interact in a somewhat detailed manner.

When conducting such virtual meetings, relatively large amounts of communication bandwidth may be required. Referring to the examples of FIGS. 1 and 2, in some embodiments each of the several cameras and microphones at each of the users A-F may be sent as a streaming real-time data stream to each of the other users A-F. In this manner, each user A-F receives multiple streams from all other users A-F. By way of illustration, Table 1 summarizes the data communicated over each link 14 in one example application:

|  | Outgoing Data Streams: | Incoming Data Streams: |
|---|---|---|
| Users A-F | 2 Cameras, 2 Microphones, 1 application = 5 total | 25 streams (5 each from Users B-F) |

As a result, in an example meeting occurring according to the configuration of FIGS. 1-2 wherein each of the users A-F are meeting with one another, each user A-F is simultaneously streaming five discrete data streams out across the communication line 14 while also simultaneously receiving 25 discrete data streams (five from each of the five other users) across the line 14. Link 14 may therefore be required to carry 30 real time streams. The bandwidth required for each of the communications lines 14 can therefore be substantial. In some configurations, all of the audio streams from each site may be bundled together for convenience. For example, data streams A4 and A5 (MIC 1 and 2) may be bundled into a single stream. Bundling of video streams is also possible in some invention embodiments, but in many no bundling of video data is provided to allow for individual manipulation of un-bundled streams.

It will also be appreciated that the schematic of FIG. 1 is simplified, and that in typical practice communication between users A-F over the communications lines 14, network 10, and bridge 12 may be routed through a plurality of computers, routers, buffers, and the like. For instance, each communications line 14 may include multiple routers and buffers between users A-F and the network 10. One advantage of IP protocol communications is that each individual packet of data includes a destination address and may be routed over any of several available paths between origination and destination. Accordingly, each of the communications lines 14 may vary somewhat for different packets—some packets may traverse a different path than other packets between the same source and destination. Further, it will be appreciated that virtual meetings such as videoconferences may include different numbers of users than users A-F illustrated, and may, in fact, include tens, hundreds, or even more users.

In addition to typical audio and video conferencing, more communication features are provided to the user by way of conference applications. These applications (also referred to as operating nodes) preferably reside on and/or are executed on the conference servers, but are not limited as such. In addition to a presence application as described above, other server applications may be provided for use during the video conference, including for example web request applications, bridge applications, gateway applications, recorder applications (for recording video, audio or other data communicated during a conference), tool applications (for various applications), entertainment applications (with examples including but not limited to one and multi player games of skill or chance, interactive games, virtual reality games, and the like), gaming applications (with examples including but not limited to games of chance, legal gambling applications, virtual dice and card games played alone or with others), music and video playback or recording applications, mapping applications (for providing geographic map information including maps, satellite imagery, directions, current location, and the like), educational and learning applications, medical diagnostic applications, word processing applications, spreadsheet applications, security applications, data organizing applications database applications, file source applications (for locating, opening and accessing files for sharing during a videoconference), and any other application programs that may be useful to one or more users participating in a video conference. Multiple substantially identical instances of these applications/operating nodes may be provided on one or more servers for redundancy, to ensure the ability to handle high volumes of users/communications, and for other reasons.

Web request, bridge, gateway, and server applications establish connection protocols and facilitate connection between a user and a server. Recorder and tool applications provide users with a graphical tool for enhancing their ability to communicate. Such applications include for example an electronic white board where users can create diagrams, drawings and the like such that they can be viewed and/or manipulated in real time by all the connected users. Entertainment, gaming, and music and video applications provide users with various types of visual or audio-based entertainment. Mapping, learning, medical diagnostic, word, and spreadsheet applications provide productivity tools for users. Finally, security applications, data organizing applications, database applications, and file source applications serve as utility applications to enhance the system's operation and performance. Notably, applications present in the described system are not limited to these examples, but instead include any and all types of software applications.

Embodiments of the present invention are directed to techniques used for users to connect to operating nodes on a server, which run one or more of the above-described applications. An operating node is system resource (or a combination of system resources), which facilitates execution of a method or process which operates an application, the system, or a portion thereof. An example operating node includes an executable program or a sub-program, which is configured to execute a set of instructions to perform a particular task within the system. An operating node can run a static, predefined set of instructions, continually generating the same output, or it can receive one or more input parameters to generate dynamic results depending on the input or current state of the system. The various applications described above correspond to sets of instructions run by an operating node. For example, in one example embodiment, the application (i.e., set of instructions) is a bridge application which is used to establish the initial communication connection with the user for launching a videoconference session.

Figure 4:
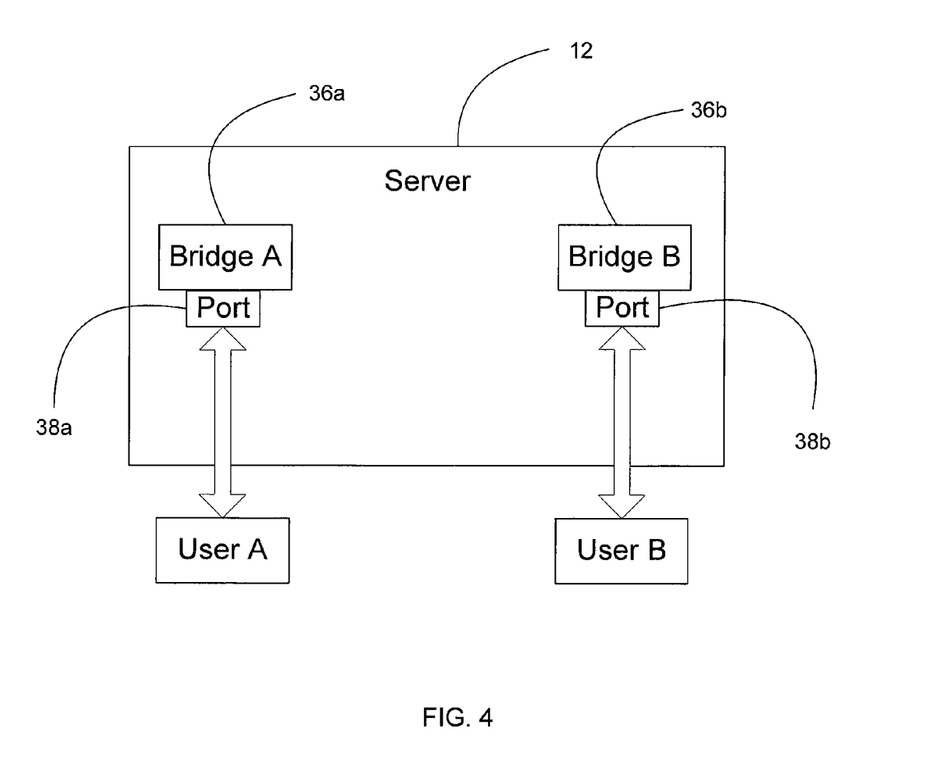
FIG. 4 is a schematic of a prior art conference server.

Turning now to FIG. 4, a traditional method in which users connect to a bridge will be described. The example server 12 includes two operating nodes 36a and 36b. These particular operating nodes run bridge applications (although as noted above, other applications could also be run by such nodes). Both operating nodes 36 include corresponding ports 38a and 38b, both of which are external. External ports are configured such that a first node (having an external port) can communicate with any other second nodes provided the first and second nodes have a physical communication path between them. Notably, such a path can be direct or indirect (i.e., having intermediate nodes in the path). To the contrary, an internal port provides communication to a limited set of nodes which are available over a communication path. The particular limitation is configurable and can be predefined (e.g., by a system administrator) to specify the group of nodes open to communication, but typically limits connections to nodes residing on a single physical entity. For example, if an operating node maintained on a server utilizes an internal port, in one example the configuration of the internal port limits communication such that the operating node can only communicate with other nodes physically residing on that same server.

As shown in FIG. 4, user A (who is external to the server 12 containing the bridge A 36a), communicates directly to bridge A 36a. Similarly, User B communicates directly to bridge B 36b. Such a technique is often the result of users receiving a redirect command originating from within the server 12. If it is determined by the server 12 or a node within the server, that the user is best suited to connect to a particular operating node 36, a redirect message is sent to the user informing him that he should connect directly with the particular operating node 36. As such, a direct connection is established. In this instance, a direct connection means that the communication is provided between the two communication nodes without any other nodes acting as forwarding nodes, redirect nodes or the like.

However, as indicated in the approach above, since ports 38 are external they are more susceptible to receiving malicious data and therefore are often monitored and/or regulated by a firewall or other regulatory hardware or software. Such monitoring and regulating can significantly complicate use of the ports 38 for conferencing. In some cases, firewalls or other regulatory control mechanisms may not grant permission for the ports 38 to be used for communication of conferencing data streams. Notably, this process becomes more complex with the added number of external ports. While the example embodiment only shows two bridges 36, each having a single external port 38, many videoconference systems 10 are far more complex, often having as many as hundreds or thousands (or more) of bridges residing on a particular server 12. Indeed, in many applications a new bridge 36 is used for each new videoconference meeting. Further, as bridges 36 (and other operating nodes) are added and removed from the server 12, adjustments to the firewall settings need to be made to ensure it is properly configured to monitor each external port 38.

Figure 5:
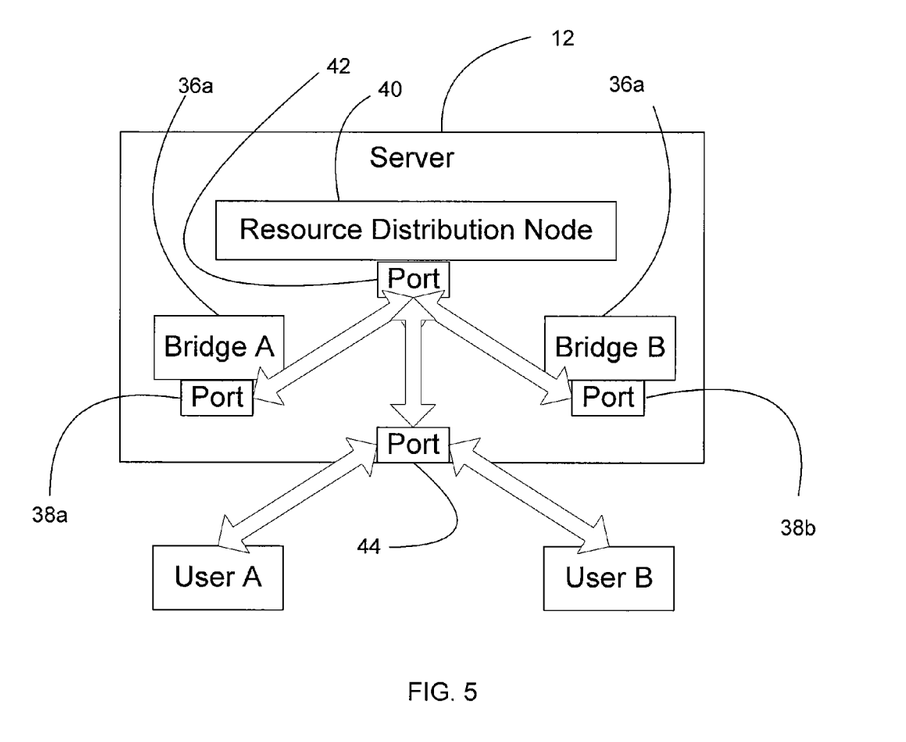
FIG. 5 is a schematic of a conference server practicing an example embodiment of the present invention.

Turning now to FIG. 5, in the present invention, a resource distribution node 40 is a type of operating node running an application which is configured to temporarily serve as a gateway between the users and the bridges 36. The resource distribution node 40 receives communication over an external port 44 on the server 12. The resource distribution node 40 has only one external port 44 which it uses to accept connections. Outside port 44 in addition to the internet address, is a unique identifier of the internet socket opened by the resource distribution node 40. Contrary to the example in FIG. 4, the ports 38 associated with the bridges 36 are internal, rather than external and therefore the users cannot connect directly to the ports 38 of the operating nodes 36. Instead, each user connects to the server's single external port 44, which is being listened to by each resource distribution node 40. The resource distribution node 40 then facilitates communication to the various bridges 36 via the internal ports 38. In one example, a connection is established by having the resource distribution node 40 submit a connection request (e.g., a group of packet data defining a request) to open a connection to the operating node 36. Once the request is received and accepted by the operating node 36, the two nodes exchange data under a defined protocol. Notably, while the term internal ports is used throughout this application, one example of such ports are domain sockets, with specific examples being Unix or inter-process communications (IPC) sockets which do not need port numbers to communicate. In embodiments of the invention, the resource distribution node 40 opens a new domain socket (with an example being a Unix domain socket) which it then connects to the bridge's unix domain socket in order to pass the connection information received over external port 44.

A domain socket, with specific examples including a Unix domain socket or IPC socket is a data communications endpoint that is similar to an Internet socket, but does not use a network protocol for communication. It may be used for inter-process communication. Unix domain connections appear as byte streams, much like network connections, but all data remains within the local computer. UNIX domain sockets use the file system as address name space, i.e. they are referenced by processes as nodes in the file system. However, the actual communication (the data exchange) does not use the file system, but buffers in kernel memory. In addition to sending data, processes can send file descriptors across a Unix domain socket connection (including file descriptors for domain sockets) using the sendmsg( ) and recvmsg( ) system calls. Domain sockets can therefore be used as an object-capability communication system.

Using the technique described above, only a single external port 44 needs to be opened or used for communication (e.g., by a system administrator or user) for the videoconference system 10 to operate (rather than having to open multiple individual ports or a range of ports as required in the traditional approach). Further, only a single port 44 needs to be monitored for malicious activity regardless of the number of users or operating nodes (e.g., bridges) 36. As such, configuring and operating a firewall or other regulatory hardware or software construct is simplified as it only needs to be configured to monitor the single external port 44.

To further facilitate efficient communication between the users and the operating nodes 36, the resource distribution node 40 is configured such that if it receives a request from a user to establish a connection with an operating node 36, the resource distribution node passes the connection to the operating node (in some embodiments through use of a unix domain socket or IPC socket) thereby creating a virtual connection between the user the operating node. A virtual connection refers generally to a communication link where the connection is logical rather than physical. For example, a virtual connection may include a communication link that appears to be a direct connection between a sender and a receiver, although physically the link can be routed through one or more intermediary nodes. In one example, such virtual connections are the result of passing connections between nodes. A more detailed description and specific techniques for this passing operation will be discussed in greater detail below.

Notably, the passing of such a connection requires that the resource distribution node 40 and the operating node 36 reside on the same server. Otherwise, the resource distribution node 40 and the operating node 36 would be unable to communicate via ports 38 since those ports are configured as internal ports. Also, preferably both the resource distribution node 40 and the operating node 36 have the same security privileges (i.e., to permit connection transfers). Notably, each node (e.g., a Linux process) runs under some predefined user security privilege. However, since one node is essentially passing access rights to a second node, each of the two nodes should run the same user security privileges. A flow-chart detailing one example passing technique is shown in FIGS. 6 and 7 and discussed in greater detail below.

Figure 6:
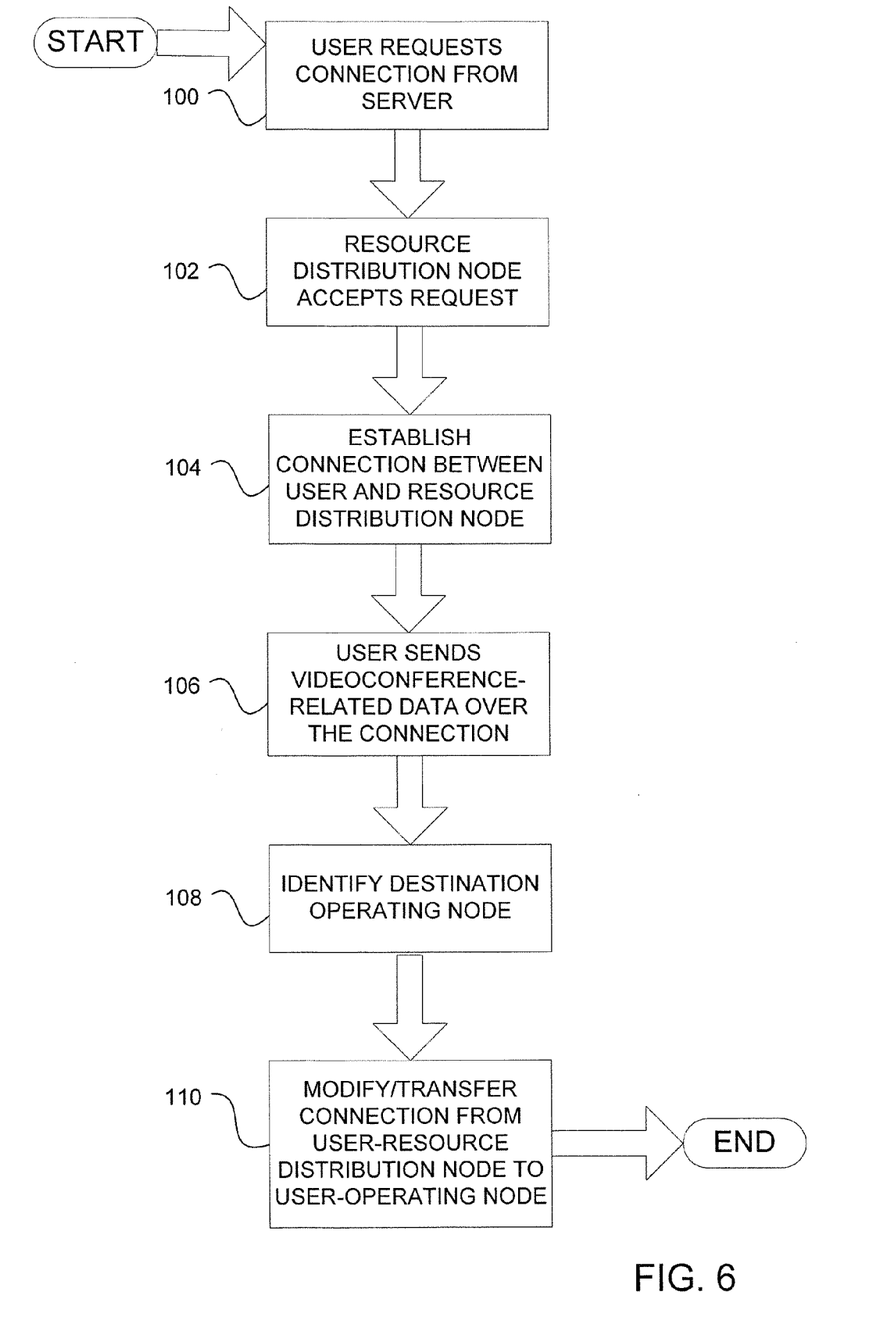
FIG. 6 is a flow chart showing operation of a resource distribution node of an example embodiment of the present invention.
Figure 7:
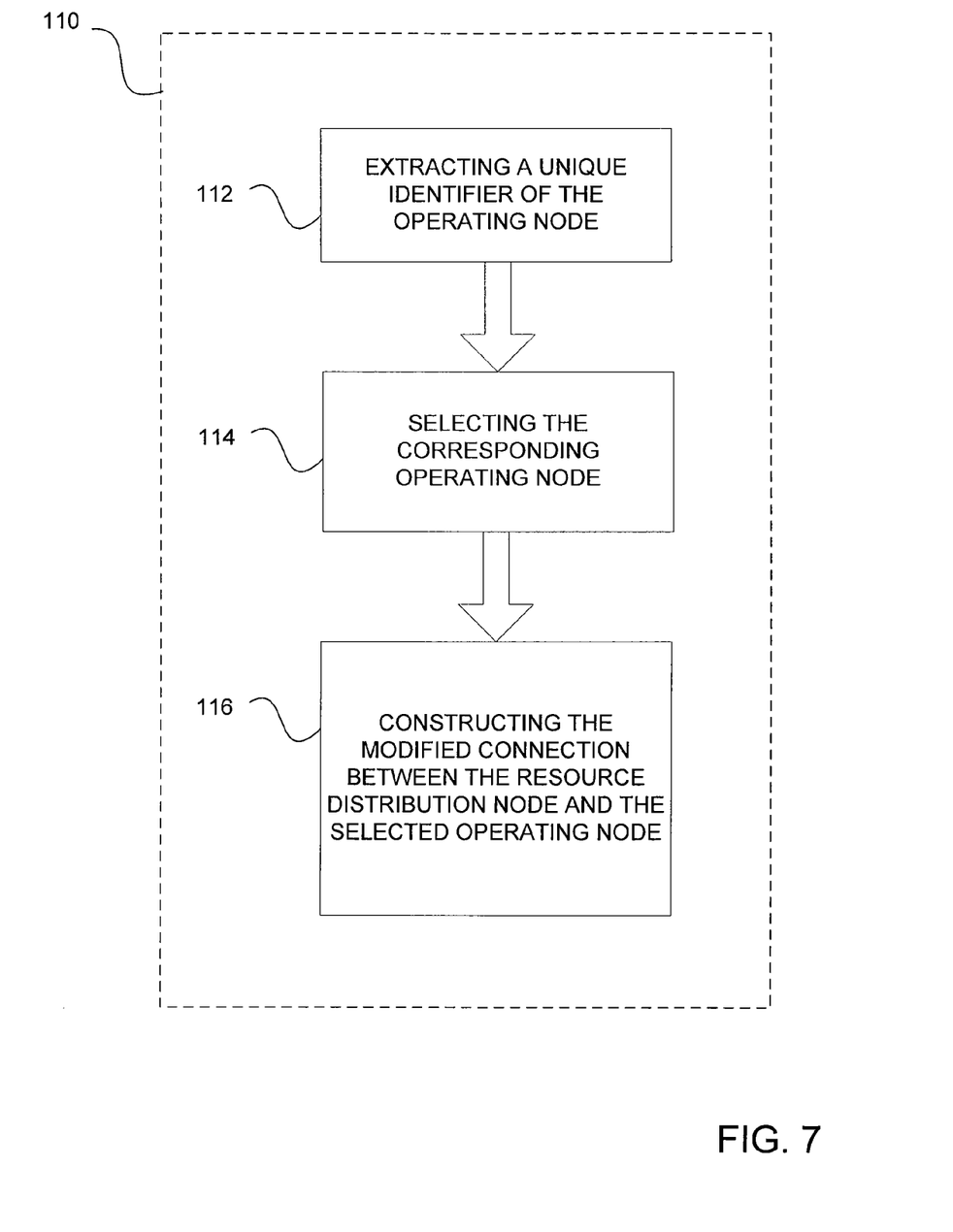
FIG. 7 is another flow chart showing operation of a resource distribution node of an example embodiment of the present invention.

Referring now to FIGS. 6 and 7, an example technique of passing the connection is shown by way of a flowchart. Initially, a connection request is made to the server 12 by a user (step 100). The connection request includes data specifying whether the user wishes to connect to an existing videoconference or create a new one. If the user is connecting to an existing conference, data identifying the conference (e.g., a conference ID) is also included. If a new conference is to be established, the resource distribution node selects an appropriate operating node to host the connection based on one or more parameters (e.g, based on selection criteria including but not limited to which node has the greatest available system resources, random selection of nodes, which node has the fewest or most current connections, which node has selected other users connected thereto, and others).

In some embodiments this step may include consultation with a load balancing node that applies selection parameters to determine the most suitable node for connection. For example, the resource distribution node 40 may communicate a request to a load balancing node (not illustrated) to select a most appropriate node for the particular request using selection criteria. The selection criteria may be specified by the resource distribution node 40 or may be known by the load balancing node. The load balancing node may apply these criteria to select the currently most suitable node, and communicate this selection information back to the resource distribution node 40.

When an incoming request is received by the server 12, it is interpreted by the resource distribution node 40, which then accepts the request (step 102) and establishes a connection between the user and the resource distribution node 40 (step 104). In one example, all packets that enter the server via port 44 get read by the resource distribution node 40, so that it can determine the next step or destination for the incoming packets. Packets can be interpreted by looking for predefined data patterns in the packet header or payload portion. Packets representing a connection request include indentifying data patterns in the packet payload portions, which can be identified by the resource distribution node 40 when the packets are received. Identifying data may be, for example, a client identifier, an IP address, or the like. Once a connection is established, the user sends videoconference-related data over the connection (step 106). Such data includes, but is not limited to audio streams, video streams, input, output, and control data related to videoconference applications (e.g., drawing board image data). Next, the resource distribution node 40 determines whether the videoconference-related data identifies as its destination an operating node 36 maintained on the server 12 (step 108). In one example, the resource distribution looks for a destination address in the header portion of the incoming packets to determine the destination. If the destination/operating node 36 is identified, the connection between the user and the resource distribution node 40 is modified (i.e., transferred) such that the new connection is now between the user and the operating node 36 (step 110). The transfer is modified by creating a new internal port 38 for each user requesting a connection to the operating node 36. Notably a connection request may include not only a request to connect for communicating data, but also for example a request to pass instructions for execution of a method (i.e., a request to use an application such as a recorder, gaming application, whiteboard, security device, communications tool, chat application, entertainment playback node (audio, music, video,) etc.). As such, a request to connect provides for a broad range of data transfer activity.

In one example embodiment, the step 110 of transferring the connection is implemented by first extracting a unique identifier of the operating node 36 from the videoconference-related data (step 112). In one example, the unique identifier is an alphanumeric identifier that uniquely identifies an operating node 36. When the data is initially send from the user, the data is modified to include this unique identifier (to specify which operating node the user wishes to communicate with). In one example, such data could be stored in the payload portion of the packet, but other techniques are also contemplated (e.g., storing the data in the packet header). Such data is then extracted on the receiving end by reading the identifier contained in payload portion of the packet.

The next step includes selecting the operating node 36 with the corresponding operating node identifier (step 114), and finally establishing a connection between the resource distribution node 40 and the selected operating node 36 (116). In one example embodiment, the server runs a Linux operating system and employs the "Send Message" and "Receive Message" APIs to pass the connection data to the operating node to establish a modified connection. Notably, this passing operation results in the passing of the access rights to the originally accepted connection to the bridge 36. Following the pass, the bridge 36 communicates directly (using port 44) with the users. However, other operating system and transfer APIs or other transfer techniques are also considered and could be used within the scope of the present invention. Such connection data typically includes data such as a file descriptor, which provides a system level identifier of the internal port 38 (e.g., the port number or a string value which identifies the port) such that the connection can be passed. The file descriptor allows nodes to read and write to the internal port 38, which facilitates communication of data between nodes. Notably, ports are needed on each end of a communication link, with each port having an associated file descriptor. Also, in this example embodiment, the connection is passed using a TCP protocol as TCP protocols provide improved integration with most firewall applications over that of other commonly used protocols. However, again other protocols are considered and could be used in its place while still being within the scope of the present invention.

In summary of one embodiment, then, that involves a conferencing bridge, a first packet from video conferencing data includes the client id which is used to associate a client with the right conference bridge. When the first data packet arrives at the resource distribution node, it extracts the client ID and constructs the path of the unix domain socket based on the client ID, and then it passes the client's connection to the bridge over that unix domain socket. Before any data streaming occurs, the bridge then knows the client ID(s) from which it is expecting data. The bridge learns about different client ID(s) during the initialization process and it creates a unique unix domain socket for each of those clients so that it will only accept passed connections incoming from this particular client ID. In this embodiment, then, the number of opened unix domain sockets for receiving connection information is equal to number of clients that will be connecting to the bridge.

With the modified connection in place (i.e., following the steps shown in FIG. 6), the operating system of the server 12 ensures that packet data received is sent to its proper destination. Notably, when a user communicates with an operating node 36, the user typically is not informed or aware that it is communicating with the resource distribution node 40. Indeed, the user merely connects to the external server port 44 of the server 12 as if it was the port on the operating node 36. However, as described above, as the data is received on the external port 44, the resource distribution node 40 reads the data (i.e., the destination address of the packets) and re-routes the traffic internally to the proper operating node 36 thereby creating a virtual connection between the user and the operating node 36.

Referring back to FIG. 5, consider another example where two users wish to connect to a bridge to communicate via a videoconference session. In this example, user A connects to operating node 36a to establish the videoconference and user B connects to operating node 36a at a later time to join the videoconference session. When user A sends a request to the server 12 to initiate the videoconference, the server receives the request on port 44 and forwards it to the resource distribution node 40 which resides on the server. Upon reading the incoming packet, the resource distribution node 40 determines that the data represents a request by a user to create a videoconference session (for example by searching for a predefined pattern in the payload packet). Next, the resource distribution node 40 selects one of the available operating nodes 36 to run a bridge application, which will initiate a new videoconference session. As described above, the resource distribution node 40 makes the selection of which operating node to choose based on predetermined system configuration preferences or selection criteria (with some example selection parameters/criteria including, but not limited to, greatest available processor speed or memory, list of existing connected users of interest, and the like).

Consider that in this example, the operating node 36a is selected over operating node 36b because it has greater processing and/or memory capacity. As such, the resource distribution node 40 would select operating node 36a to run a bridge application. Since the operating node 36a is running a bridge application, it will be referred to as bridge A 36a. Consider is this example that the server 12 is running a Linux operating system and has access to the "Send Message" and "Receive Message APIs." Since the operating node 36a has been selected, the operating system can now redirect incoming packets which are received on port 44 of the server 12 (and forwarded to the resource distribution node 40). Once the resource distribution node 40 receives such packets, the packets are interpreted (e.g., by reading the header and/or payload data) to determine that the packets represent data send from user A.

As described above, the user A has no knowledge of the passing performed by the resource distribution node, and instead knows only that it communicates with a port on the server 12. Indeed, user A likely presumes the packet is being delivered directly to bridge A 36a (i.e., without first traversing the resource distribution node 40). User A has seamlessy been connected to the bridge A without receiving a redirect or other communication back from the resource distribution node that specifies the address of the bridge A. Further, communication of both the initial request and the subsequent streaming data traverses the server single external port. Reconnection using a different external port is avoided, thereby simplifying connection and reducing interference by security devices such as firewalls.

Since user B is joining an existing videoconference, the connection request from user B will specify which particular session is to be joined. Indeed, in many embodiments a user needs to request a specific session to join. As such, the passing technique used for user B is similar to that used for user A except that since the pack contains information regarding the destination bridge (e.g., the unique operating node ID), packet inspection by the resource distribution node 40 provides for a determination of where the packets should be sent. Therefore, again the "Send Message" and "Receive Message" APIs are used to ensure that packets received by the resource distribution nodes are sent to the proper destination (i.e., bridge A 38a). Again, the connection between user B and bridge A 38a is a virtual connection in that user A presumes he is communicating directly with the port 38a, instead of first traversing the resource distribution node 40.

The various steps of the embodiment of FIGS. 6 and 7 may be altered and otherwise modified. Also, as explained above, they may be performed by various different program products, various different portions of one or more program products, or different elements of the videoconference systems. As an example, all or some of these steps may be carried out by a stand-alone videoconference maintenance program product, by one or more of the distribution nodes, or by a master videoconference server program.

Through practice of invention embodiments various advantages and benefits are achieved. As an example, in the prior art sequential connection to first and second external ports may have been required where practice of embodiments of the invention result in connection to only a single external port. By way of particular example, the initial contact with a resource distribution node to select a conferencing bridge might have required connection using a first external port in the prior art, and then when a bridge is selected the resource distribution node may have issued a redirect or other message back to the user specifying the location of the bridge. The user would then establish a new connection with the bridge, which often required using a second external server port. As a result, many prior art methods, systems and program products required use of two server external ports while embodiments of the present invention accomplish this while using a single port.

Prior art methods, systems and program products added to consumption and congestion of external ports as compared to invention embodiments. Further, many security devices (with examples including firewalls) present difficulties when connecting to external ports for communication of streaming data with the result that the fewer the number of ports required to be connected to the better.

Those knowledgeable in the art will appreciate the broad scope of the present invention as claimed below and that the representative collaboration event and video conference system, method and program product examples discussed herein are illustrative only. It will further be appreciated that many variations are possible within the scope of the invention as claimed herein below. The sequence of steps and arrangement of hierarchical levels of the example embodiments illustrated herein and in corresponding flowcharts, for example, could easily be altered. Also, some steps, parameters, and other elements may be omitted and others substituted. Equivalents to the steps and elements recited will be apparent to those knowledgeable in the art. Variable, file, level, set, and other element names have been used herein for convenience only, and these names should not be interpreted in a manner that unduly limits the invention.

What is claimed is:

1. A single videoconference server for use with a videoconference system in which a plurality of users communicate video and audio data to each other, the single server comprising;
at least one physical server external port;
at least one resource distribution node operating on the single server and having at least a first internal port in communication with said physical server external port;
a plurality of operating nodes operating on the single server and including at least one internal port which is in communication with the resource distribution node, and
said resource distribution node being configured to receive a request for establishing a connection with one of the plurality of operating nodes from a user over the physical server external port, and when said request is received, establishing a virtual connection between the user and one of the plurality of operating nodes using the physical server external port for communication of videoconference related data, wherein the only connection between the user and said operating node is through the physical server external port in communication with said resource distribution node and through said resource distribution node, and the resource distribution node is configured to pass connections among the plurality of operating nodes on the single server based upon selection criteria.

2. The single videoconference server of claim 1 wherein the single server has exactly one physical server external port configured to receive videoconference-related data.

3. The videoconference server of claim 2 wherein the plurality of operating comprises at least one being a conference bridge that connects different users to one another for communicating streaming videoconference data to one another, at least one being a recorder for recording video data communicated during a conference, and at least one being an entertainment application.

4. The videoconference server of claim 1 further comprising an operating system embedded on a tangible memory in said single server, wherein a forwarding construct embedded in said operating system facilitates the passing of the connection.

5. The videoconference server of claim 4 wherein said operating system is Linux and said forwarding construct is a "Send Message" API, and wherein said request is a request to connect to a videoconference bridge operating node.

6. The videoconference server of claim 1 wherein at least one of said plurality of operating nodes is a videoconference bridge node, and wherein said resource distribution node has at least a second internal port that is in communication with the videoconference bridge node first internal port.

7. The videoconference server of claim 1 wherein said connection being passed is a connection established using TCP protocol.

8. The videoconference server of claim 1 wherein:
said plurality of operating nodes comprises a plurality of redundant operating nodes, each of which is suitable to execute said request;
if said request identifies one of said operating node as its destination, said resource distribution node passes its connection to said identified operating node; and
if said request does not identify one of said plurality of operating nodes as its destination said resource distribution node applies the selection criteria to select one of said plurality of redundant operating nodes to pass its connection to.

9. The videoconference server of claim 1 wherein said resource distribution node and said operating node are assigned the same security privileges whereby each of the resource distribution node and operating node can permit connection transfers to the user in response to a user request.

10. The videoconference server of claim 1 wherein at least one of said resource distribution node and said operating node internal ports are domain sockets.

11. The videoconference server of claim 1 wherein the request communicated from the user includes a unique operating node ID, and wherein the operating node corresponds to the received operating node ID.

12. A computer program product for establishing a connection between a user and an operating node included within a single videoconference server, the single videoconference server further comprising a resource distribution node, the program product comprising executable instructions stored on a non-transitory tangible medium, the instructions when executed causing the resource distribution node to perform steps comprising:
accepting an incoming connection request from the user communicated from a first server external port, thereby establishing a connection between the user and the resource distribution node over the first server external port;
receiving videoconference-related data over the connection;
determining whether said videoconference-related data identifies one of a plurality of operating nodes maintained on the server as its destination; and,
if such said destination is identified, transferring the connection between the user and the resource distribution node to a modified connection between the user and one of the plurality of operating nodes selected by the resource distribution node according to selection criteria, whereby the selected one of the plurality of operating nodes communicates with the user over the first physical server external port, wherein the only connection between the user and said selected one of the plurality of operating nodes is through said resource distribution node.

13. The computer program product of claim 12 wherein the modified connection is established by using a Send Message API to pass connection data to an internal port of the selected one of the operating nodes, and wherein the selected one of the operating nodes uses a Receive Message API to receive connection data sent from the resource distribution node.

14. The computer program product of claim 13 wherein said operating node internal port is a domain socket.

15. The computer program product of claim 13 wherein the connection data includes a file descriptor.

16. The computer program product of claim 12 wherein the program product further causes the resource distribution node to use the selection criteria to select one of the plurality of operating nodes on the server when the resource distribution node determines that the videoconference related data does not identify one of the plurality of operating nodes.

17. The computer program product of claim 16 wherein the selection criteria includes one or more of amount of available memory resources and amount of available processor resources.

18. The computer program product of claim 12 wherein said step of transferring the connection is performed by the following steps:
- extracting a unique operating node identifier from the videoconference-related data;
- selecting one of the plurality of operating nodes with the corresponding operating node identifier; and
- constructing the modified connection between the resource distribution node and the selected one of the plurality of operating nodes.

19. The computer program product of claim 12 wherein at least one of the plurality of operating nodes is a videoconference bridge node, and wherein an internal port is designated on the at least one of the plurality of operating nodes to receive data on the modified connection.

20. A single videoconference server for use with a videoconference system in which a plurality of users communicate video and audio data to each other, comprising;
- at least one physical server external port;
- at least one resource distribution node operating on the single video conference server and having at least a first domain socket, the first domain socket in communication with said physical server external port;
- at least two videoconference bridge operating nodes each including at least one domain socket,
- wherein said resource distribution node is configured to receive a first request from a first user over the physical server external port, the request for establishing a connection with a videoconference bridge operating node, wherein the resource distribution node is configured to apply selection criteria to determine the most suitable of said at least two videoconference bridge operating nodes to connect said first user to, and to pass the connection with the physical server external port to the selected videoconference bridge operating node using said videoconference bridge domain socket to thereby establish a virtual connection between the user and the selected videoconference bridge operating node using the physical server external port for communication of videoconference related data, wherein the only connection between the user and said operating node is through said resource distribution node, and
- wherein said resource distribution node is configured to receive a second request from a second user to connect to a videoconference bridge operating node, said second request including an identifier that designates said selected videoconference bridge operating node, said resource distribution node passing its connection to said selected videoconference bridge operating node using said selected videoconference bridge operating node domain socket and without performing the step of using selection criteria to select said selected videoconference bridge operating node.

* * * * *